(12) United States Patent
Golov

(10) Patent No.: US 12,715,454 B2
(45) **Date of Patent: *Aug. 25, 2026**

(54) DETERMINATION OF RELIABILITY OF VEHICLE CONTROL COMMANDS VIA MEMORY TEST

(71) Applicant: Lodestar Licensing Group LLC, Evanston, IL (US)

(72) Inventor: Gil Golov, Backnang (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,023

(22) Filed: Jan. 31, 2024

(65) Prior Publication Data

US 2024/0166218 A1 May 23, 2024

Related U.S. Application Data

(63) Continuation of application No. 17/208,612, filed on Mar. 22, 2021, now Pat. No. 11,945,452, which is a (Continued)

(51) Int. Cl.
*G05D 1/02* (2020.01)
*B60W 50/02* (2012.01)

(Continued)

(52) U.S. Cl.
CPC ......... *B60W 50/0205* (2013.01); *G05D 1/227* (2024.01); *G05D 1/81* (2024.01);

(Continued)

(58) Field of Classification Search
CPC ......... B60W 50/0205; B60W 2710/20; B60W 2050/021; B60W 2720/106;

(Continued)

(56) References Cited

U.S. PATENT DOCUMENTS

| | | | |
|---|---|---|---|
| 6,108,598 | A | 8/2000 | Sumitani |
| 7,509,567 | B1 | 3/2009 | Kiselev et al. |

(Continued)

FOREIGN PATENT DOCUMENTS

| | | |
|---|---|---|
| CN | 104216835 | 12/2014 |
| EP | 2437171 | 4/2012 |

OTHER PUBLICATIONS

Backhausen, Ulrich, et al. “Robustness in Automotive Electronics: An Industrial Overview of Major Concerns.” IEEE, Jul. 3, 2017.

(Continued)

*Primary Examiner* — Masud Ahmed

(57) ABSTRACT

A vehicle having a control element for the speed, acceleration or direction of the vehicle, a computing device to generate a command in autonomous driving of the vehicle, and a command controller coupled between the control element and the computing device. In response to the command, the command controller initiates a test of a portion of the memory of the computing device. If the portion of the memory passes the test, the command controller forwards the command for execution via the control element of the vehicle; otherwise, the command controller blocks the command and/or issues a replacement command for the vehicle.

21 Claims, 3 Drawing Sheets

Related U.S. Application Data continuation of application No. 15/855,175, filed on Dec. 27, 2017, now Pat. No. 10,981,576.

(51) Int. Cl.
*G05D 1/227* (2024.01)
*G05D 1/81* (2024.01)

(52) U.S. Cl.
CPC ... *B60W 2050/021* (2013.01); *B60W 2710/20* (2013.01); *B60W 2720/106* (2013.01)

(58) Field of Classification Search
CPC ........ B60W 2050/0005; B60W 50/029; G05D 1/0088; G06N 3/04; B60Y 2302/05
USPC .............................................................. 701/3
See application file for complete search history.

(56) References Cited

U.S. PATENT DOCUMENTS 8,145,822 B2 3/2012 Hachmann et al.
8,601,321 B2 * 12/2013 Feng ................ G01R 31/31719 714/27
8,751,860 B2 6/2014 Feeley et al.
9,110,832 B2 8/2015 Feeley et al.
9,331,989 B2 5/2016 Dover
9,502,128 B2 11/2016 Lee
9,533,579 B2 1/2017 Nomura
9,569,622 B2 * 2/2017 Dover .................. G06F 21/575
9,613,214 B2 * 4/2017 Dover .................... G06F 21/57
10,431,299 B2 10/2019 Tokutomi et al.
10,836,402 B2 11/2020 Golov
10,901,862 B2 1/2021 Golov
10,933,882 B2 3/2021 Golov
10,981,576 B2 4/2021 Golov
11,507,175 B2 11/2022 Golov
11,691,638 B2 7/2023 Golov
11,704,204 B2 7/2023 Golov
11,945,452 B2 4/2024 Golov
2006/0212195 A1 9/2006 Veith et al.
2009/0210777 A1 8/2009 Weiberle et al.
2012/0102477 A1 4/2012 Kim et al.
2013/0007345 A1 1/2013 Barbou-des-places et al.
2013/0166866 A1 6/2013 Yerushalmi et al.
2013/0232366 A1 9/2013 Nishijima
2014/0075087 A1 3/2014 Bartling et al.
2014/0140135 A1 5/2014 Okano et al.
2014/0208151 A1 7/2014 Fernandez
2014/0229724 A1 8/2014 Chen et al.
2015/0088358 A1 3/2015 Yopp
2015/0089287 A1 3/2015 Jayakumar et al.
2015/0094899 A1 4/2015 Hackenberg et al.
2015/0280919 A1 * 10/2015 Cullen ................. G05D 1/0077 701/3
2015/0331055 A1 11/2015 Yuhei et al.
2016/0162422 A1 6/2016 Weber
2016/0349692 A1 12/2016 Tomimatsu
2017/0024127 A1 1/2017 Bazarsky et al.
2017/0075352 A1 * 3/2017 Nordbruch ............. G01C 21/36
2017/0090476 A1 3/2017 Letwin et al.
2017/0180929 A1 6/2017 Cavendish et al.
2017/0243484 A1 8/2017 Li et al.
2017/0300052 A1 10/2017 Harda et al.
2017/0351968 A1 12/2017 Bowers et al.
2017/0361712 A1 12/2017 Terao et al.
2018/0039538 A1 2/2018 Freikorn et al.
2018/0074718 A1 3/2018 Lee
2018/0086267 A1 3/2018 Nix
2018/0203622 A1 7/2018 Ishiguro
2019/0163367 A1 5/2019 Bazarsky et al.
2019/0180526 A1 6/2019 Mehdizade et al.
2019/0193745 A1 6/2019 Golov
2019/0193746 A1 6/2019 Golov
2019/0193747 A1 6/2019 Golov
2019/0317864 A1 10/2019 Ma
2020/0125441 A1 4/2020 Omori et al.
2020/0142472 A1 5/2020 Golov
2020/0151067 A1 5/2020 Golov
2021/0046944 A1 2/2021 Golov
2021/0141699 A1 5/2021 Golov
2021/0163024 A1 6/2021 Golov
2021/0229684 A1 7/2021 Golov
2023/0076311 A1 3/2023 Golov
2023/0339481 A1 10/2023 Golov
2024/0012723 A1 1/2024 Golov

OTHER PUBLICATIONS

Humphry, Jonathan, et al. "A Fault-Tolerant/Fail-Safe Command and Control System for Automated Vehicles." IEEE, Mar. 23, 2015.
International Search Report and Written Opinion, Int. App. No. PCT/US2018/052634, mailed Jan. 20, 2019.
International Search Report and Written Opinion, PCT/US2019/058936, mailed Feb. 21, 2020.
P. Balasubramanian et al., "A Fault Tolerance Improved Majority Voter for TMR System Architectures", WSEAS Transactions on Circuits and Systems, vol. 15, 2016, pp. 108-122.
RAID, https://en.wikipedia.org/wiki/RAID, printed on Oct. 25, 2018, 11 pages.
Sandeep Kaushik, Yervant Zorian, "Embedded memory test and repair optimizes SoC yields", Jul. 17, 2012.
Tosson, Amr M.S., et al., "8T1R: A Novel Low-power High-speed RRAM-based Non-volatile SRAM Design." 2016 International Great lakes Symposium on VLSI(GLSVLSI), ACM, Aug. 15, 2016.
Wang, Jiachun, "Locomotive CCU Board Design and Development Based on SAMA5D35." China's Excellent Master's Thesis Full-text Database Engineering Science and Technology II, Abstract only, Sep. 15, 2014.
Simevski, Aleksandar, et al., "Scalable Design of a Programmable NMR Voter with Inputs' State Descriptor and Self-checking capability." 2012 NASA/ESA Conference on Adaptive Hardware and Systems, IEEE, 2012.

* cited by examiner

DETERMINATION OF RELIABILITY OF VEHICLE CONTROL COMMANDS VIA MEMORY TEST

RELATED APPLICATIONS

The present application is a continuation application of U.S. patent application Ser. No. 17/208,612 filed Mar. 22, 2021, which is a continuation application of U.S. patent application Ser. No. 15/855,175 filed Dec. 27, 2017 and issued as U.S. Pat. No. 10,981,576 on Apr. 20, 2021, the entire disclosures of which applications are hereby incorporated herein by reference.

TECHNICAL FIELD

At least some embodiments disclosed herein relates to vehicle control in general and more particularly, but not limited to, the reliability of commands generated by computing devices for autonomous control of vehicles.

BACKGROUND

Recent developments in the technological area of autonomous driving allow a computing system to operate, at least under some conditions, control elements of a vehicle without the assistance from a human operator of the vehicle.

For example, sensors (e.g., cameras and radars) can be installed on a vehicle to detect the conditions of the surroundings of the vehicle on a roadway. A computing system installed on the vehicle analyzes the sensor inputs to identify the conditions and generate control signals or commands for the autonomous adjustments of the direction and/or speed of the vehicle, without any input from a human operator of the vehicle.

In some arrangements, when a computing system recognizes a situation where the computing system may not be able to continue operating the vehicle in a safe manner, the computing system alerts the human operator of the vehicle and requests the human operator to take over the control of the vehicle and drive manually, instead of allowing the computing system to drive the vehicle autonomously.

U.S. Pat. App. Pub. No. 2015/0094899, entitled "METHOD FOR DRIVER ASSISTANCE SYSTEM OF A VEHICLE" and published on Apr. 2, 2015, discloses a method to alert a driver to take control of the vehicle, when the distance between the current location of the vehicle and an end of a route section that has been identified for driving by the computing system is shorter than a threshold. U.S. Pat. App. Pub. No. 2017/0300052, entitled "HANDOVER NOTIFICATION ARRANGEMENT, A VEHICLE AND A METHOD OF PROVIDING A HANDOVER NOTIFICATION" discloses a further technique to hand over the control of the vehicle back to a human driver.

U.S. Pat. No. 9,533,579, entitled "ELECTRONIC CONTROL APPARATUS FOR ELECTRICALLY-DRIVEN VEHICLE" and published Jan. 3, 2017, discloses an electronic control apparatus of a vehicle that has a self-diagnosis function.

U.S. Pat. No. 8,601,321, entitled "SYSTEM-ON-A-CHIP (SOC) TEST INTERFACE SECURITY" and published Dec. 3, 2013, discloses a system on chip (SoC) that, during a time to boot up its processor, reads a memory area storing a scrambled portion of firmware to create a descrambled value for a determination of whether a test interface to access the processor by an external device is authorized.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
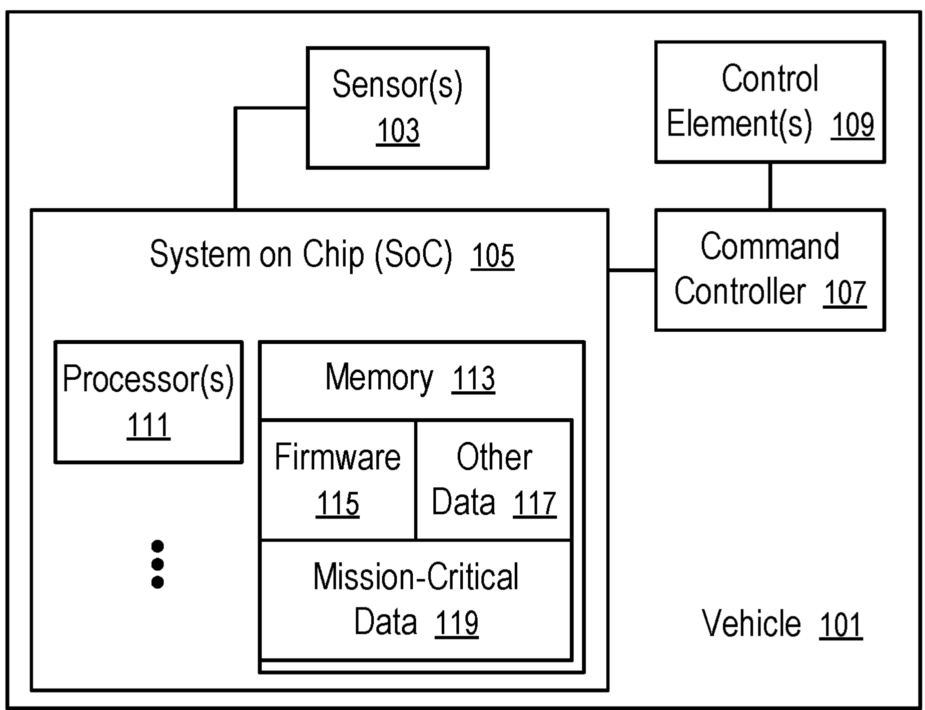
FIG. 1 shows a vehicle having a command controller according to one embodiment.

At least some embodiments disclosed herein provide a command controller that determines the reliability of a command generated by a computing device for the autonomous driving of a vehicle by testing a portion of the memory of the computing device. The command controller blocks the command and/or initiates an emergency response when the computing device fails the memory test.

For example, when a vehicle uses a system on chip (SoC) to generate a command for an autonomous operation of a vehicle (e.g., steering the wheels of the vehicle, adjusting the speed of a motor of the vehicle, activating the brakes of the vehicle), the command controller determines whether the command can be trusted based on a determination of whether the SoC is damaged. If the SoC is damaged in part, the command generated by SoC is considered unreliable and thus can be blocked for an emergency response.

The health of the memory the SoC may be considered the proxy of the health of the SoC as a whole. When certain areas of the memory of the SoC are damaged, especially the mission critical portions of the memory, the reliability of the SoC in generating commands for autonomous driving is considered compromised. Thus, when the SoC fails a test of a mission critical part of its memory, the command generated by the SoC for autonomous driving may be blocked; and one or more safe-mode commands may be generated to place the vehicle in a safe condition.

For example, a command controller can be configured on a command communication path from the SoC to a control element that effectuates a command from the SoC. The command controller is configured to intercept the command that is issued by the SoC and that affects the operation of the control element of the vehicle. In some instances, the command is directly executed by the control element; and in other instances, the command is further processed by another computing device (e.g., another SoC) to generate control signals or commands for the control element.

In response to intercepting the command from the SoC to the control element, the command controller initiates a memory test on the SoC, preferably testing one or more mission sensitive or critical areas of the memory of the SoC, such as a memory area that stores the software/firmware used for the generation of the command, a memory area that stores the data based on which the command is generated.

If the SoC passes the test of selected areas of its memory, the controller provides the intercepted command to the vehicle for execution or effectuating by the control element; otherwise, the SoC may be considered defective, which causes the command controller to identify the command as being generated in error and prevent the command from reaching the control element, and/or causes the command controller to generate one or more basic replacement commands to place the vehicle in a safe condition.

For example, in response to the SoC failing a memory test, the command controller may request a human operator of the vehicle to take over the control of the vehicle, communicate with a remote server to obtain a replacement command if a suitable communication channel is available, activate an emergency signal of the vehicle, activate a predetermined emergency command or routine for operating the vehicle under emergency conditions (e.g., slowing down the vehicle for a stop).

In some implementations, the command controller is implemented using a computing device external to the SoC using hardware. Preferably, the hardware of the command controller is more reliable and/or durable than the SoC. Alternatively, the command controller may be implemented as part of the SoC in controlling its output using a dedicated hardware circuitry and/or firmware.

FIG. 1 shows a vehicle (101) having a command controller (107), a system on chip (SoC) (105), one or more sensors (103), and one or more control elements (109).

In FIG. 1, the command controller (107) has memory (113) and one or more processors (111); and the command controller (107) is coupled between the SoC (105) and the controller element(s) (109) to prevent commands generated by the SoC (105) from reaching the control element(s) (109) when the commands are determined to be unreliable.

In general, the command controller (107) may a self-diagnosis function to evaluate the health state of the SoC (105), including the memory (113) and the processors (111). The result of the self-diagnosis function may be used to determine the reliability of the commands generated by the SoC (105). Preferably, the reliability of the commands or outputs of the SoC (105) is tested (e.g., on a per command basis, or periodically) in real time during autonomous driving based at least in part on the results of testing one or more selected portions of the memory (113).

The SoC (105) of FIG. 1 receives data from the sensor(s) (103) and executes, using its processor(s) (111), firmware (115) stored in the memory (113) to generate commands affecting the control element(s) (109) that can effectuate the autonomous driving of the vehicle (101). For example, the sensor(s) (103) may include a visible light camera, an infrared radiation camera, a light detection and ranging (lidar), a radio detection and ranging (radar), etc.

The processor(s) (111) and the memory (113) of the SoC (105) are typically sealed inside a same integrated circuit package. However, the processor(s) (111) and the memory (113) may or may not be formed on a single silicon substrate.

When the SoC (105) has a damaged circuitry (e.g., processor(s) (111)), it is likely that the memory (113) of the SoC (105) is also damaged. When a portion of the memory (113) storing the firmware (115) and/or mission-critical data (119) for the execution of the firmware (115) is determined to be damaged after the generation of a command, it is likely that the command is an erroneous result of the execution of the firmware (115). Thus, the memory testing result of the SoC (105) can be used as a proxy indicator of the health of the SoC (105) and be assessed in real time during autonomous driving.

In general, the SoC (105) may also receive inputs from other computing devices (not shown in FIG. 1) that are configured on the vehicle (101), such as an input or a command from another SoC that provides a prepossessing result of the sensor(s) (103) or another sensor (not shown in FIG. 1).

Similarly, the command or output generated by the SoC (105) may also be used as an input to other computing devices, such as another SoC, which post-processes the command or output of the SoC (105) to drive the control element(s) (109).

For example, the vehicle (101) may be configured as a car or automobile driven by an electric motor or an internal combustion engine. The control element(s) (109) may include a brake of the vehicle (101), an acceleration control of the vehicle (101), a steering control of the vehicle (101), a turn signal of the vehicle control (101), etc.

For improved reliability, the testing of the health of the SoC (105) is performed in real time in response to the command or output generated by the SoC (105), especially when the command or output has an impact on the operation of the control element(s) (109).

Performing a complete diagnosis of the SoC (105) may be time consuming and, if performed on a per command basis, may cause unacceptable delay in providing the command/output from the SoC (105) to the control element(s) (109). Optionally, a complete diagnosis of the SoC (105) may be performed during certain time periods (e.g., when the vehicle (101) is in a parking mode, during the startup of the vehicle) but not performed during the time period of active driving to avoid interference with the autonomous driving function of the SoC (105).

Preferably, the command controller (107) initiates a test of a mission critical portion of the memory (113) to balance the need for reliability check in the commands/outputs from the SoC (105) and the need to avoid excessive delay in the propagation of the commands/outputs from the SoC (105) to the control element(s) (109).

The mission critical portion of the memory (113) may include the portion storing the firmware (115) for instructing the processor(s) (111) to perform computations that result in the generation the commands/outputs of the SoC (105) and/or the portion of the memory (113) that stores the mission-critical data (119) used in generation of the commands/outputs of the SoC (105). Examples of the mission-critical data (119) include the synaptic weights of an artificial neural network for the recognition of an event or object captured by the sensor(s) (103) and/or for the generation of the driving decision responsive to the recognition of the event or object.

The memory (113) may include a portion that stores other data (117) that are not used to generate the commands/outputs of the SoC (105) and/or a portion that does not currently store any valid data when the SoC (105) outputs its command or control signals. The command controller (107) may skip the testing of such a portion of the memory (113) of the SoC (105).

The mission critical portion of the memory (113) may be are predefined. For example, the modules of a firmware (115) and the mission-critical data (119) for the generation of one command may be configured to be stored in a predefined area of the memory (113). The predefined area may be identified by one or more blocks of physical addresses or logical addresses. In response to the detection of a command in the output of the SoC (105), the predefined area of the memory (113) is tested as a proxy of the health of the SoC (105). The mission critical portion of the memory (113) may be selected based on the type of the commands/outputs generated by the SoC (105), in accordance with the identification of modules and data items responsible for the generation of the type of the commands/outputs.

Alternatively or in combination, a randomly selected portion of the memory (113) may be tested, where the test result is used as a health proxy of the SoC (105) as a whole.

The SoC (105) is optionally configured with a circuit for self-testing a portion of its memory (113). The circuit is activated by the command controller (107) to generate a test result in response to a command/output being generated by the SoC (105). In some instances, the function of the self-testing circuit is alternatively implemented by, at least in part, the processor(s) (111) executing a module of the firmware (115).

Alternatively, the command controller (107) may communicate through a test interface of the SoC (105) to access the memory (113) to perform the test of a selected portion of the memory (113) of the SoC (105).

In some instances, the function of the system on chip (105) is not implemented in a single integrated circuit chip. For example, more than one integrated circuit chip may be used to implement the function of the SoC (105) illustrated in FIG. 1. When the components for implementing the function of the system on chip (105) are located close to each other, the memory test can also be used to indicate the health of the components as a whole.

In some instances, the command controller (107) is implemented as a system on chip or an on-board computer of the vehicle (101). Alternatively, the command controller (107) may be integrated within the SoC (105).

Figure 2:
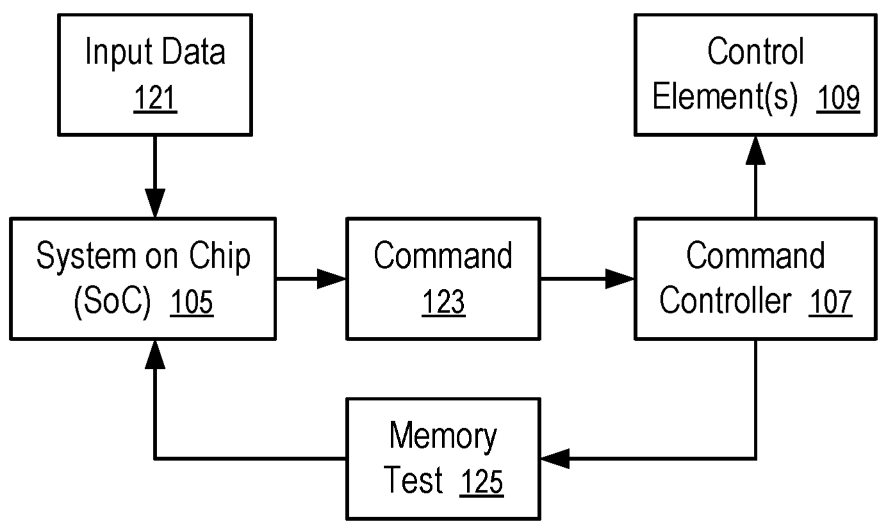
FIG. 2 illustrates the operations of a command controller to check the reliability of commands from a computing device of a vehicle according to one embodiment.

FIG. 2 illustrates the operations of a command controller to check the reliability of commands from a computing device of a vehicle according to one embodiment. For example, the operations illustrated in FIG. 2 can be implemented in a vehicle (101) illustrated in FIG. 1 or in another system.

In FIG. 2, the SOC (105) receives input data (121) to generate a command (123) that affects or controls the operation of the control element(s) (109).

The command controller (107) intercepts the command (123) on the communication path from the SoC (105) to the control element(s) (109).

In response to such a command (123), the command controller (107) generates or initiates a memory test (125).

In some implementations, the memory test (125) is for a predetermined area of the memory (113) of the SoC (105), independent on the command (123).

In other implementations, the command controller (107) selects the area of the memory (113) for the memory test (125) based on the content of the command (123).

For example, based on a type of the command (123), the command controller (107) identifies the modules of the firmware (115) that are used for the generation of the command (123) and performs, or requests, the memory test (125) of the portion of the memory (113) that stores the identified modules of the firmware (115).

For example, based on a type of the command (123), the command controller (107) identifies the data components (e.g., 119) that are used for the generation of the command (123) and performs, or requests, the memory test (125) of the portion of the memory (113) that stores the identified data components (115).

In some instances, the firmware (115) and/or the mission-critical data (119) are stored with redundancy and/or parity data that enables the testing of the health of the portion(s) of the memory (113) storing the firmware (115) and/or the data (119), without performing write operations in the tested portion(s) of the memory (113) of the SoC (105).

Figure 3:
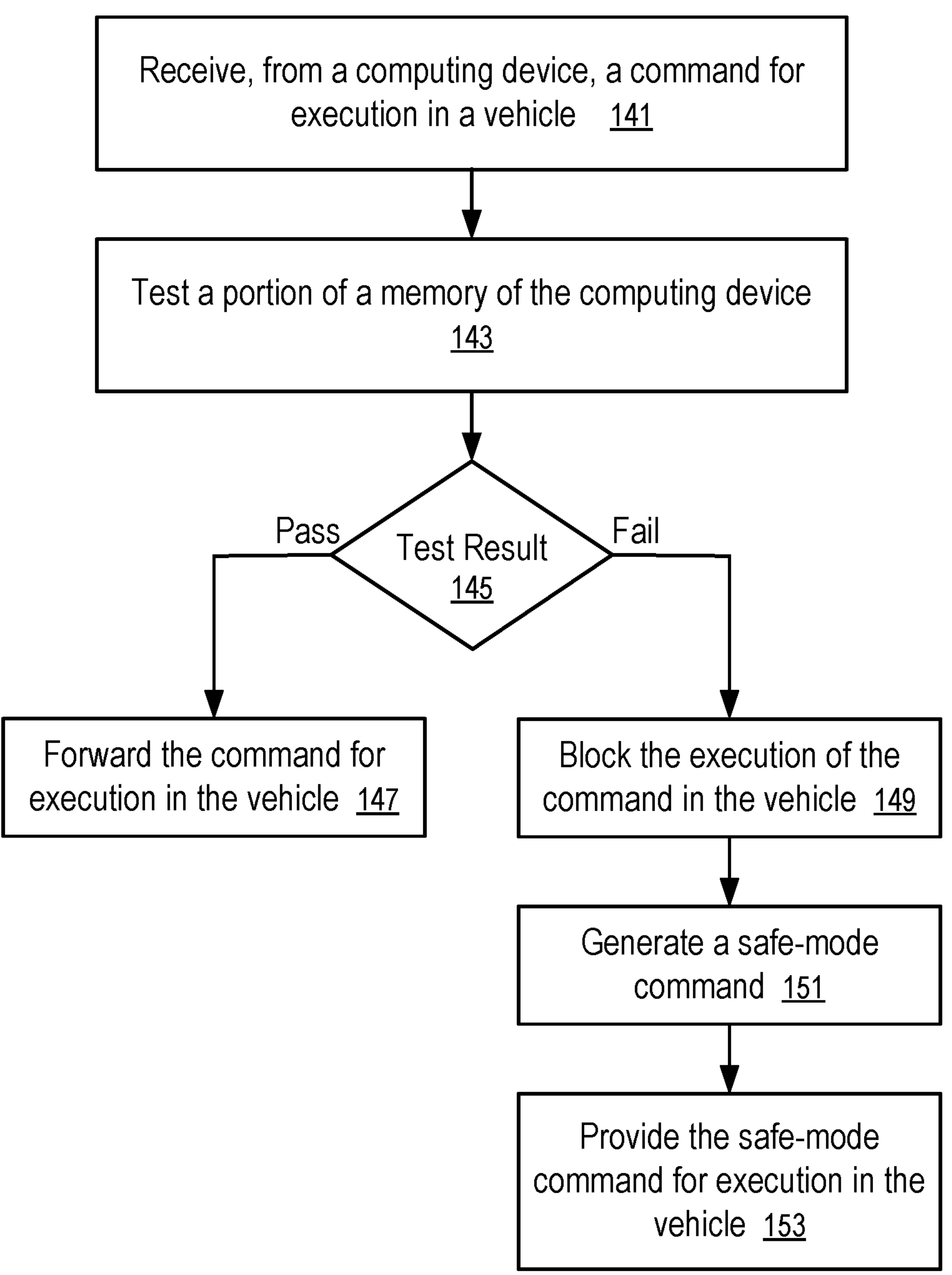
FIG. 3 shows a method to process a command from a computing device of a vehicle according to one embodiment.

FIG. 3 shows a method to process a command from a computing device of a vehicle according to one embodiment. For example, the method of FIG. 3 can be implemented in the vehicle (101) of FIG. 1 to perform operations illustrated in FIG. 2.

The method of FIG. 3 includes: receiving (141), from a computing device (e.g., SoC (105)), a command (123) for execution in a vehicle (101); testing (143) a portion (e.g., 115 and 119) of a memory (113) of the computing device (e.g., SoC (105)); determining (145) from the test result whether the memory (113) of the computing device (e.g., SoC 105) has passed the test (125) or failed the test (125); and, if it is determined (145) that the memory (113) has passed the test (125), forwarding (147) the command (123) for execution in the vehicle (101).

If it is determined (145) that the memory (113) has failed the test (125), the method of FIG. 3 further includes: blocking (149) the execution of the command (123) in the vehicle (101); generating (151) a safe-mode command; and providing (153) the safe-mode command for execution in the vehicle (101).

Figure 4:
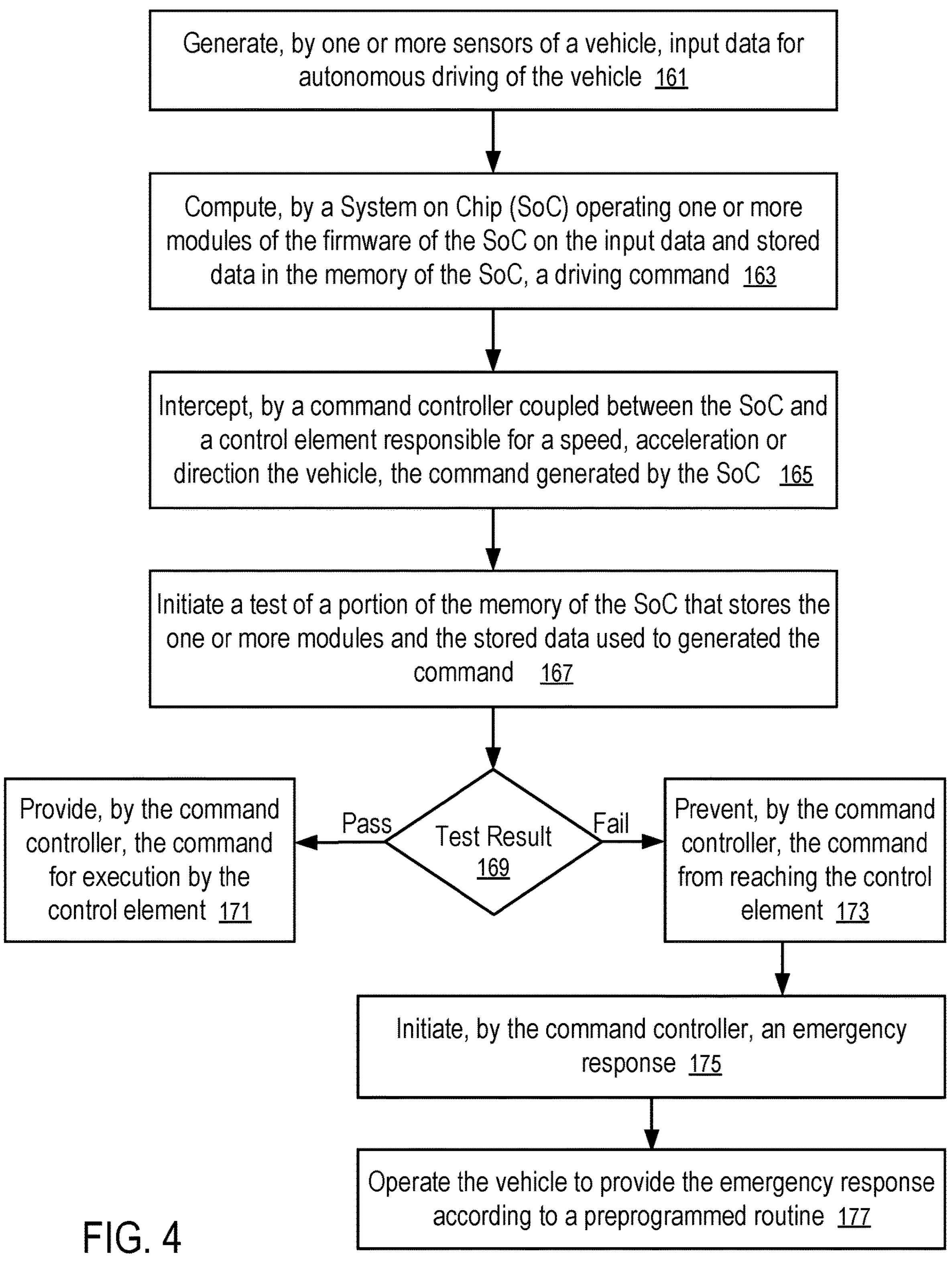
FIG. 4 shows a detailed method to enhance the reliability of a vehicle having an autonomous driving function according to one embodiment.

FIG. 4 shows a detailed method to enhance the reliability of a vehicle having an autonomous driving function according to one embodiment. For example, the method of FIG. 4 can be implemented in the vehicle (101) of FIG. 1 to perform operations illustrated in FIG. 2.

The method of FIG. 4 includes: generating (161), by one or more sensors (103) of a vehicle (101) (e.g., a visible light camera, an infrared camera, a sonar, a radar, a lidar), input data (121) for/during autonomous driving of the vehicle (101); computing (163), by a system on chip (SoC) (105) operating one or more modules of the firmware (115) of the SoC (105) on the input data (121) and stored data (119) in the memory (113) of the SoC (105), a driving command (123); intercepting (165), by a command controller (107) coupled between the SoC (105) and a control element (109) responsible for a speed, acceleration or direction the vehicle (101) (e.g., an accelerator, a brake, a steering mechanism of the vehicle), the command (123) generated by the SoC (105); initiating (167) a test (125) of a portion of the memory (113) of the SoC (105) that stores the one or more modules and the stored data (119) used to generate the command (123); determining (145) from the test result whether the portion of the memory (113) of the computing device (e.g., SoC 105) has passed the test (125) or failed the test (125); and, if 169 the portion of the memory (113) of the computing device (e.g., SoC 105) has passed the test (125), providing (171), by the command controller (107), the command (123) for execution by the control element (109).

If 169 the portion of the memory (113) of the computing device (e.g., SoC 105) has failed the test (125), the method of FIG. 4 further includes: preventing (173), by the command controller (107), the command (123) from reaching the control element (109); initiating (175), by the command controller (107), an emergency response; and operating (177) the vehicle (101) to provide the emergency response according to a preprogrammed routine.

For example, the emergency response may include: requesting a human operator of the vehicle (101) to take control of the vehicle (101); starting a preprogrammed emergency response routine to place the vehicle (101) in a safe condition; and/or reducing the speed of the vehicle (101) for a stop.

In some instances, the portion of the memory (113) that is being tested (125) is identified based on a type of the command (123). Based on the type of the command (123), the command controller (107) and/or the SoC (105) identifies the modules of the firmware (115) responsible for outputting the command (123) and its associated data (119) responsible for outputting the command (123). The portion of the memory (113) being tested is identified to exclude, from the test (125), a portion of the memory (113) that is not used, or stores other data (117) that are not responsible for outputting the command (123), or stores other modules of the firmware (115) that are not responsible for outputting the command (123).

In some implementations, the command controller (107) is external to the SoC (105) that is sealed in an integrated circuit package. Alternatively, the command controller (107) may be part of the SoC (105), implemented via the processor(s) (111) executing a module of the firmware (115) and/or implemented via a hardware circuitry.

The SoC (105) may include a memory test circuitry that performs the test (125) in response to a request from the command controller (107).

The present disclosure includes methods and apparatuses which perform these methods, including data processing systems which perform these methods, and computer readable media containing instructions which when executed on data processing systems cause the systems to perform these methods.

The SoC (105), the command controller (107) and/or the computer system for the autonomous driving of the vehicle (101) can be implemented as one or more data processing systems.

A typical data processing system may include an inter-connect (e.g., bus and system core logic), which interconnects a microprocessor(s) and memory. The microprocessor is typically coupled to cache memory.

The inter-connect interconnects the microprocessor(s) and the memory together and also interconnects them to input/output (I/O) device(s) via I/O controller(s). I/O devices may include a display device and/or peripheral devices, such as mice, keyboards, modems, network interfaces, printers, scanners, video cameras and other devices known in the art. In one embodiment, when the data processing system is a server system, some of the I/O devices, such as printers, scanners, mice, and/or keyboards, are optional.

The inter-connect can include one or more buses connected to one another through various bridges, controllers and/or adapters. In one embodiment the I/O controllers include a universal serial bus (USB) adapter for controlling USB peripherals, and/or an IEEE-1394 bus adapter for controlling IEEE-1394 peripherals.

The memory may include one or more of: read only memory (ROM), volatile random access memory (RAM), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or ethernet interface, can also be used.

In the present disclosure, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to non-transitory, recordable and non-recordable type media such as volatile and non-volatile memory devices, read only memory (ROM), random access memory (RAM), flash memory devices, floppy and other removable disks, magnetic disk storage media, optical storage media (e.g., compact disk read-only memory (CD ROM), digital versatile disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

The above description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing device, comprising:

a memory;

a logic circuit coupled to the memory and configured to generate, based at least in part on data stored in the memory, a command for execution; and a controller operable to effectuate the command generated by the logic circuit, wherein the controller is further configured to initiate a test of a portion of the memory, wherein the controller effectuates the command only if the test indicates that the portion of the memory is not damaged.

2. The computing device of claim 1, wherein the data stored in the memory includes instructions executed in the computing device to generate the command.

3. The computing device of claim 1, wherein the data stored in the memory includes synaptic weights of an artificial neural network; and the command is generated based on an output of the artificial neural network.

4. The computing device of claim 1, wherein the memory and the logic circuit are configured in a system on a chip.

5. The computing device of claim 1, further comprising:

a sensor, wherein the command is generated further based on data generated by the sensor.

6. The computing device of claim 5, wherein the sensor is configured to generate image data.

7. The computing device of claim 5, wherein the command is configured to control an operation of a vehicle.

8. The computing device of claim 7, wherein the operation relates to acceleration, speed, or direction of the vehicle.

9. A vehicle, comprising:

a sensor;

a control element operable to adjust acceleration, speed, or direction of the vehicle;

a memory;

a logic circuit configured to use the memory to generate a command based at least in part on data from the sensor; and a controller coupled between the logic circuit and the control element to determine whether to effectuate the command.

10. The vehicle of claim 9, wherein the memory and the logic circuit are configured in a system on a chip.

11. The vehicle of claim 10, wherein the memory is configured to store instructions executable in the system on the chip to generate the command in response to the data from the sensor.

12. The vehicle of claim 11, wherein the memory is further configured to store synaptic weights of an artificial neural network used in the generation of the command.

13. The vehicle of claim 12, wherein the controller is configured to perform a test of the memory in determination of whether to effectuate the command.

14. A method, comprising:

generating, based at least in part on data stored in a memory, a command for execution; and determining, based on a test of a predetermined portion of the memory and in response to the command being generated for execution, whether to provide the command for execution, wherein the command is provided for execution only if the test indicates that the predetermined portion of the memory is not damaged.

15. The method of claim 14, further comprising:

performing, in response to the command being generated for execution, a test of the memory;

wherein the determining of whether to provide the command for execution is based at least in part on a result of the test of the memory.

16. The method of claim 15, wherein the generating of the command includes executing instructions stored in the memory.

17. The method of claim 16, wherein execution of the instructions is configured to implement computations of an artificial neural network based on synaptic weights stored in the memory.

18. The method of claim 17, wherein the artificial neural network is configured to process data from a sensor to generate the command.

19. The method of claim 18, further comprising:

executing, by a control element of a vehicle, the command to control an operation of the vehicle, in response to a determination to provide the command to the control element for execution.

20. The method of claim 19, wherein execution of the command by the control element adjusts at least acceleration, speed, or direction of the vehicle.

21. The computing device of claim 1, wherein the portion of the memory is a predetermined portion of the memory.

* * * * *